United States Patent
Evans (10) Patent No.: US 9,599,229 B2
(45) Date of Patent: Mar. 21, 2017

(54) CARTRIDGE SEAL FOR A CENTRIFUGAL PUMP

(71) Applicant: Gary K. Evans, Kilgore, TX (US)

(72) Inventor: Gary K. Evans, Kilgore, TX (US)

( * ) Notice: Subject to any disclaimer, the term of this patent is extended or adjusted under 35 U.S.C. 154(b) by 324 days.

(21) Appl. No.: 14/519,896

(22) Filed: Oct. 21, 2014

(65) Prior Publication Data

US 2016/0108926 A1    Apr. 21, 2016

(51) Int. Cl.
| | |
|---|---|
| *F04D 17/10* | (2006.01) |
| *F04D 29/08* | (2006.01) |
| *F16J 15/34* | (2006.01) |
| *F04D 7/02* | (2006.01) |
| *F04D 29/12* | (2006.01) |

(52) U.S. Cl.
CPC ............ *F16J 15/3404* (2013.01); *F04D 7/02* (2013.01); *F04D 29/128* (2013.01); *F16J 15/348* (2013.01); *F16J 15/3436* (2013.01)

(58) Field of Classification Search
CPC .......... F04D 7/02; F04D 17/10; F04D 29/083; F04D 29/128; F16J 15/3404; F16J 15/3436; F16J 15/348
See application file for complete search history.

(56) References Cited

U.S. PATENT DOCUMENTS

| | | | | |
|---|---|---|---|---|
| 5,336,047 A * | 8/1994 | Kolhouse | ............... | F04D 29/126 277/353 |
| 5,375,852 A * | 12/1994 | Charhut | ............... | F16J 15/3404 277/371 |
| 5,927,722 A * | 7/1999 | Carmody | ............. | F16J 15/3484 277/368 |
| 6,471,215 B1 * | 10/2002 | Drago | ................... | F16J 15/166 277/412 |
| 6,761,359 B2 * | 7/2004 | Azibert | ................ | F16J 15/3404 277/370 |
| 7,044,471 B2 | 5/2006 | Elliott et al. | | |
| 7,431,304 B2 * | 10/2008 | Dahlheimer | ......... | F16J 15/3476 277/370 |
| 7,673,479 B2 * | 3/2010 | Dahlheimer | ......... | F16J 15/3472 277/371 |
| 7,712,744 B2 * | 5/2010 | Roddis | ................. | F16J 15/3464 277/370 |
| 8,167,315 B2 * | 5/2012 | Nedlich | .................... | F16J 15/38 277/390 |
| 8,931,783 B2 * | 1/2015 | Quarmby | ............. | F16J 15/3404 277/370 |

OTHER PUBLICATIONS

Singh, "Mechanical Seal Vs Gland Packing," Apr. 2011, 4 pages, accessed Oct. 20, 2014. http://www.slideshare.net/om_singh/mechanical-seal-vs-gland-packing.

* cited by examiner

*Primary Examiner* — Igor Kershteyn
(74) *Attorney, Agent, or Firm* — Yee & Associates, P.C.

(57) ABSTRACT

A cartridge seal for centrifugal pump comprises a shaft tube assembly attached to a structure. A shaft tube of the shaft tube assembly receives a shaft of the centrifugal pump. A shaft collar of the cartridge seal attached to a second end of the shaft tube is in communication with a second end of the structure. A chamber tube of the shaft tube assembly and the shaft tube collectively define a chamber that contains compressed gas. A spring is located in the chamber of compressed gas. The compressed gas and the spring cause the shaft tube assembly to substantially prevent movement of fluids between the shaft and the structure in the centrifugal pump.

20 Claims, 11 Drawing Sheets

CARTRIDGE SEAL FOR A CENTRIFUGAL PUMP

BACKGROUND INFORMATION

1. Field

The present disclosure relates generally to a cartridge seal and, in particular, to a cartridge seal for a centrifugal pump. Still more particularly, the present disclosure relates to an apparatus and system for using compressed gas in a cartridge seal in a centrifugal pump.

2. Background

Common uses of centrifugal pumps include water, sewage, petroleum, and petrochemical pumping. The pumping of fluids by a centrifugal pump occurs via rotational energy. A centrifugal pump typically converts rotational energy into the energy of a moving fluid via an impeller.

The rotational energy of a centrifugal pump may come from an engine, an electric motor or some other suitable source of rotational energy. The impeller is typically attached to the source of rotational energy via a shaft. As the shaft is forced to spin, the shaft in turn causes the impeller to rotate about the axis of the shaft. Fluid entering the centrifugal pump comes in contact with the rotating impeller. When the fluid comes in contact with the rotating impeller, the fluid gets caught up in blades of the impeller. The rotational force of the impeller causes the fluid to accelerate with increased energy before exiting through the output of the pump.

A structure within a centrifugal pump is typically used to keep fluids from coming in contact with the motor. This structure is normally located between the impeller and the motor with the shaft going through the structure. This structure is sometimes called a gland. A seal is sometimes present at the location where the shaft goes through the structure. Together, the structure and the seal substantially prevent leakage of the fluid around the shaft. While many types of seals have been used for this purpose, cartridge seals are a type of seal that is typically recommended for this purpose.

A spring is typically used to maintain contact of the cartridge seal with the structure. Compression springs are a type of spring normally used in cartridge seals. Compression springs include coil springs and wave springs. These compression springs become shorter when compressed. Compression springs generate a force that resists the compression.

The force generated by a compressed spring is known as elastic energy. When compressed, the amount of elastic energy produced by a compression spring will reduce over time. This loss of elastic energy is known as elastic fatigue. Over time, elastic fatigue of the spring may result in the spring needing to be replaced. The amount of elastic force needed from the spring to prevent leakage, may result in the spring needing to be replaced sooner than desired.

The amount of space available in a cartridge seal for a spring is limited. This space limitation reduces the size of the spring that can be used. The reduction in the size of the spring may result in elastic fatigue occurring faster than desired.

Therefore, it would be advantageous to have an apparatus and system that takes into account at least some of the issues discussed above, as well as other possible issues.

SUMMARY

In one illustrative embodiment, a cartridge seal for a centrifugal pump comprises a structure having a first end and a second end to which a shaft tube assembly of the cartridge seal is attached. The cartridge seal also comprises a shaft tube of the shaft tube assembly having a first end with a larger outside circumference than a second end of the shaft tube, and an interior portion of the shaft tube that receives a shaft of the centrifugal pump. The cartridge seal also comprises a shaft collar of the cartridge seal attached to the second end of the shaft tube in communication with the second end of the structure. The cartridge seal also comprises a chamber tube of the shaft tube assembly in communication with the first end of the shaft tube, the first end of the structure, and a portion of the shaft tube between the first end of the shaft tube and the second end of the shaft tube. The chamber tube and the shaft tube collectively define a chamber that contains compressed gas. A spring located in the chamber of compressed gas. The compressed gas and the spring cause the shaft tube assembly to substantially prevent movement of fluids between the shaft and the structure in the centrifugal pump.

In another illustrative embodiment, a system to prevent movement of fluids between two chambers of a centrifugal pump comprises a sealing unit having a shaft tube system and a structural unit. The structural unit has a first end, a second end, an axial hole for holding the shaft tube system, and the structural unit is mounted between the two chambers of the centrifugal pump. The system also comprises the shaft tube system attached to the first end and the second end of the structural unit. The system also comprises a shaft tube of the shaft tube system having a first end with a larger outside circumference than a second end of the shaft tube, and an interior portion of the shaft tube receives a shaft of the centrifugal pump. The system still further comprises a shaft collar of the sealing unit attached to the second end of the shaft tube and is in communication with the second end of the structural unit. Further, the system comprises a chamber tube of the shaft tube system is in communication with the first end of the shaft tube, the first end of the structural unit, and a portion of the shaft tube between the first end of the shaft tube and the second end of the shaft tube. The chamber tube and the shaft tube collectively define a chamber that contains compressed gas. The system still further comprises a spring located in the shaft tube chamber of compressed gas. The compressed gas and the spring cause the cartridge seal to substantially prevent the movement of fluids between the two chambers of the centrifugal pump.

In yet another illustrative embodiment, a method to operate centrifugal pumps comprises assembling a centrifugal pump having a motor, an impeller, a shaft attached to the motor and the impeller, a cartridge seal on the shaft at a location between the impeller and the motor, and a centrifugal pump body with an input in communication with the impeller and an output in communication with the impeller. The cartridge seal is attached to the centrifugal pump body of the centrifugal pump between the impeller and the motor. The method also comprises running the motor to turn the shaft, a shaft tube assembly of the cartridge seal, and the impeller. Turning the impeller causes fluids to move from the input of the centrifugal pump body to the output of the centrifugal pump body. Compressed gas and a spring in a chamber of the shaft tube assembly cause the cartridge seal to substantially prevent movement of fluids in the centrifugal pump body of the centrifugal pump at the location along the shaft where the cartridge seal is located between the impeller and the motor.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that existing cartridge seals for preventing movement between chambers of a centrifugal pump may be insufficient. One type of cartridge seal uses a spring to maintain contact between the cartridge seal and a gland in the centrifugal pump. However, the spring may lose elasticity over time. Additionally, the spring may not provide a desired amount of force for maintaining the contact between the cartridge seal and the gland.

Thus, the illustrative embodiments provide a cartridge seal for a centrifugal pump, a system to prevent movement of fluids between two chambers of a centrifugal pump, and a method to operate centrifugal pumps. In one illustrative embodiment, a cartridge seal for a centrifugal pump comprises a structure having a first end and a second end to which a shaft tube assembly of the cartridge seal is attached. A shaft tube of the shaft tube assembly has a first end with a larger outside circumference than a second end of the shaft tube, and an interior portion of the shaft tube that receives a shaft of the centrifugal pump. A shaft collar of the cartridge seal is attached to the second end of the shaft tube and is in communication with the second end of the structure. A chamber tube of the shaft tube assembly is in communication with the first end of the shaft tube, the first end of the structure, and a portion of the shaft tube between the first end of the shaft tube and the second end of the shaft tube. The chamber tube and the shaft tube collectively define a chamber that contains compressed gas. A spring is located in the chamber of compressed gas. The compressed gas and the spring cause the shaft tube assembly to substantially prevent movement of fluids between the shaft and the structure in the centrifugal pump.

Figure 1:
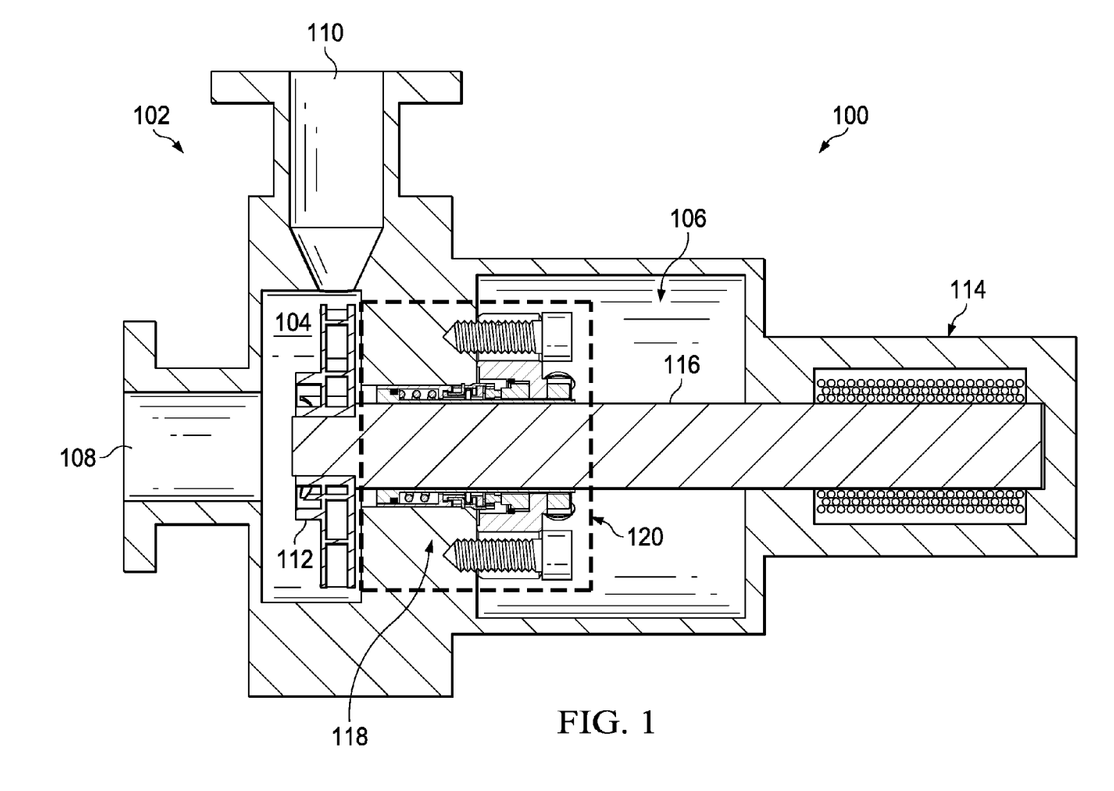
FIG. 1 is an illustration of an example of a centrifugal pump environment in which a cartridge seal will be used in accordance with an illustrative embodiment.

With reference now to the figures, and in particular, with reference to FIG. 1, an illustration of an example of a centrifugal pump environment in which a cartridge seal will be used is depicted in accordance with an illustrative embodiment.

In this illustrative example, centrifugal pump environment 100 includes centrifugal pump 102. As depicted, centrifugal pump 102 includes chamber 104 and chamber 106. In this illustrated example, chamber 104 includes input 108, output 110, and impeller 112.

As depicted, chamber 106 includes motor 114. Shaft 116 of centrifugal pump 102 is attached to impeller 112 and motor 114.

In this illustrative example, cartridge seal system 118 is located between chamber 104 and chamber 106. As depicted, cartridge seal system 118 is attached to shaft 116. Cartridge seal system 118 includes a structure and a chamber. In this illustrative example, the structure of cartridge seal system 118 is attached to centrifugal pump 102 between chamber 104 and chamber 106.

As depicted, the chamber in cartridge seal system 118 contains compressed gas. As used herein, the compressed gas may be made up of various common components of air. For example, the compressed gas may be a combination of oxygen, nitrogen, and other types of gasses typically found in air. A spring is located in the chamber of compressed gas. The compressed gas and the spring result in an amount of force that causes cartridge seal system 118 to maintain contact with the structure of cartridge seal system 118. This contact results in cartridge seal system 118 substantially preventing movement of fluids over shaft 116 between chamber 104 and chamber 106.

A more detailed view of cartridge seal system 118 is shown and described later. For example, FIG. 9 includes a magnified view of portion 120.

Figure 2:
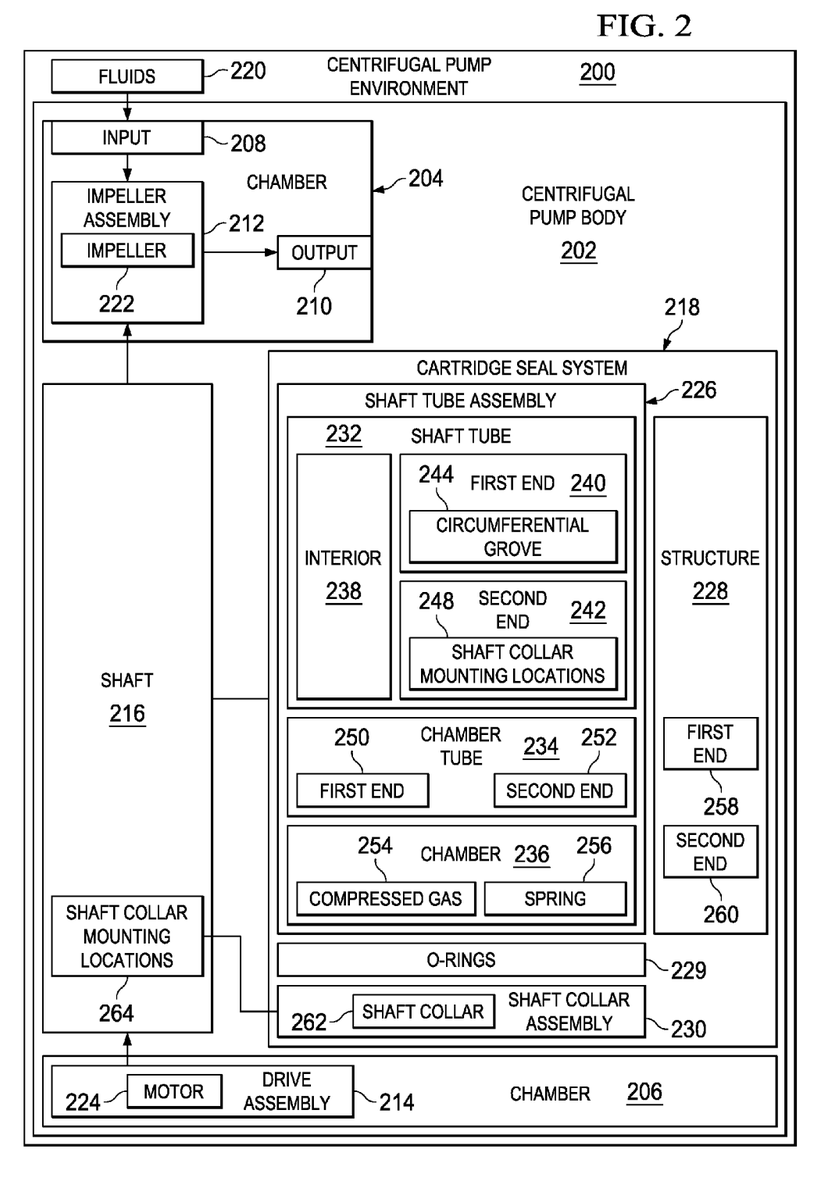
FIG. 2 is an illustration of a block diagram of components of a centrifugal pump environment in accordance with an illustrative embodiment.

Turning next to FIG. 2, an illustration of a block diagram of components of a centrifugal pump environment is depicted in accordance with an illustrative embodiment. Centrifugal pump environment 100 in FIG. 1 is an example of one implementation of centrifugal pump environment 200 shown in block form in FIG. 2.

As depicted, centrifugal pump environment 200 includes centrifugal pump body 202. Centrifugal pump body 202 includes chamber 204, and chamber 206. In this illustrated example, chamber 204 has input 208, output 210, and impeller assembly 212. Chamber 206 has drive assembly 214 in this illustrative example. As depicted, shaft 216 is attached to impeller assembly 212 and drive assembly 214.

In this illustrative example, cartridge seal system 218 is located between chamber 204 and chamber 206. Cartridge seal system 218 is attached to shaft 216 in this illustrative example. As depicted, fluids 220 enter centrifugal pump body 202 through input 208 and exit centrifugal pump body 202 through output 210. Cartridge seal system 218 prevents movement of fluids 220 over shaft 216 between chamber 204 and chamber 206.

As depicted, impeller assembly 212 includes impeller 222. Impeller assembly 212 may also include hardware used to attach impeller 222 to shaft 216. For example, the hardware used to attach impeller 222 to shaft 216 may include at least one of a number of fasteners, a number of washers, a number of retaining rings, or other suitable types of hardware. A number of items is one or more items. For example, a number of fasteners is one or more fasteners.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

As depicted, drive assembly 214 includes motor 224. In this illustrative example, motor 224 is at least one of an engine, an electric motor, or some other suitable source of rotational energy in centrifugal pump environment 200. Drive assembly 214 may also include hardware used to attach motor 224 to shaft 216. For example, the hardware used to attach motor 224 to shaft 216 may include at least one of a number of fasteners, a number of washers, a number of retaining rings, or other suitable types of hardware.

In this illustrative example, cartridge seal system 218 includes shaft tube assembly 226, structure 228, a number of o-rings 229, and shaft collar assembly 230. As depicted, shaft tube assembly 226 is a number of components located on shaft 216. Shaft tube assembly is attached to shaft 216 via shaft collar assembly 230. In this illustrative example, shaft tube assembly 226 and shaft collar assembly 230 are in communication with structure 228. Structure 228 is attached to centrifugal pump body 202. The components of cartridge seal system 218 substantially prevent movement of fluids between chamber 204 and chamber 206 in this illustrative example.

As depicted, shaft tube assembly 226 includes shaft tube 232, chamber tube 234, and chamber 236. In this illustrative example, shaft tube 232 includes interior 238 for receiving shaft 216. Shaft 216 substantially occupies interior 238 of shaft tube 232 when cartridge seal system 218 is attached to shaft 216. For example, interior 238 may have at least one of a cylindrical shape, a conical shape, a rectangular shape, or some other suitable shape for placing shaft tube 232 over shaft 216.

In this illustrative example, shaft tube 232 also includes first end 240 and second end 242. First end 240 of shaft tube 232 has a larger outer diameter than an outer diameter of second end 242 in this illustrative example. As depicted, first end 240 of shaft tube 232 includes circumferential grove 244 for one of the number of o-rings 229. Second end 242 of shaft tube 232 includes a number of shaft collar mounting locations 248 for attaching shaft tube 232 to shaft collar assembly 230 in this illustrative example.

As depicted, chamber tube 234 has first end 250 and second end 252. In this illustrative example, first end 250 of chamber tube 234 has an inner diameter slightly larger than the outer diameter of first end 240 of shaft tube 232. Second end 252 of chamber tube 234 has an inner diameter slightly larger than the outer diameter of second end 242 of shaft tube 232 in this illustrative example.

In this illustrated example, chamber 236 is formed between shaft tube 232 and chamber tube 234 when chamber tube 234 is attached to shaft tube 232. For example, a height of chamber 236 is the difference between the inner diameter of first end 250 of chamber tube 234 and the outer diameter of second end 242 of shaft tube 232. In this example, a volume of chamber 236 is based on the height of the chamber and a distance between first end 240 of shaft tube 232 and second end 252 of chamber tube 234.

As depicted, chamber 236 includes compressed gas 254 and spring 256. In this illustrative example, compressed gas 254 and spring 256 force shaft tube assembly 226 and shaft collar assembly 230 to stay in communication with structure 228. For example, an o-ring in o-rings 229 located within chamber 236 may form a seal in chamber 236. In this example, a lubricant in contact with the o-ring may form a wet seal within chamber 236 at a location of chamber tube 234 where first end 250 of chamber tube 234 is in communication with circumferential grove 244 of first end 240 of shaft tube 232.

In this illustrative example, structure 228 includes first end 258 and second end 260. Second end 252 of chamber tube 234 is in contact with first end 258 of structure 228. Shaft collar assembly 230 is in contact with second end 260 of structure 228 in this illustrative example. Second end of chamber tube 234 and shaft collar assembly 230 act as bearings at the points of contact where chamber tube 234 and shaft collar assembly 230 comes in contact with structure 228. For example, shaft tube assembly 226 and shaft collar assembly 230 rotate when shaft 216 is turned. In this example, structure 228 does not move when shaft 216 is turned as structure 228 remains attached to centrifugal pump body 202.

Cartridge seal system 218 may also include hardware used to attach structure 228 to centrifugal pump body 202 in this illustrative example. For example the hardware used to attach structure 228 to centrifugal pump body 202 may include at least one of a number of fasteners, a number of washers, a number of lock washers, or other suitable types of hardware.

As depicted, shaft collar assembly 230 includes shaft collar 262. In this illustrative example, shaft 216 includes a number of shaft collar mounting locations 264. Cartridge seal system 218 is attached to the number of shaft collar mounting locations 264 using shaft collar assembly 230 in this illustrative example.

Shaft collar assembly 230 may also include hardware used to attach shaft collar 262 to the number of shaft collar mounting locations 264 of shaft 216 and the number of shaft collar mounting locations of second end 242 of shaft tube 232 in this illustrative example. For example, hardware used to attach shaft collar 262 to shaft 216 and shaft tube 232 may include at least one of a number of fasteners, a number of washers, a number of set screws, or other suitable types of hardware.

In this illustrative example, compressed gas 254 and spring 256 result in an amount of force that causes shaft tube assembly 226 of cartridge seal system 218 to maintain contact with structure 228 of cartridge seal system 218. This contact results in cartridge seal system 218 substantially preventing movement of fluids over shaft 216 between chamber 204 and chamber 206. The prevention of the movement of fluids over shaft 216 between chamber 204 and chamber 206 is maintained for a longer period of time when compressed gas 254 is used in chamber 236.

The illustration of centrifugal pump environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment For example, a gas valve may be located in cartridge seal system 218 to adjust compressed gas 254. In this example, an amount of gas in compressed gas 254 may be adjusted using the gas valve. As another example, a hole in shaft 216 in communication with a hole in shaft tube 232 may be used to adjust the amount of gas in compressed gas 254.

Figure 3:
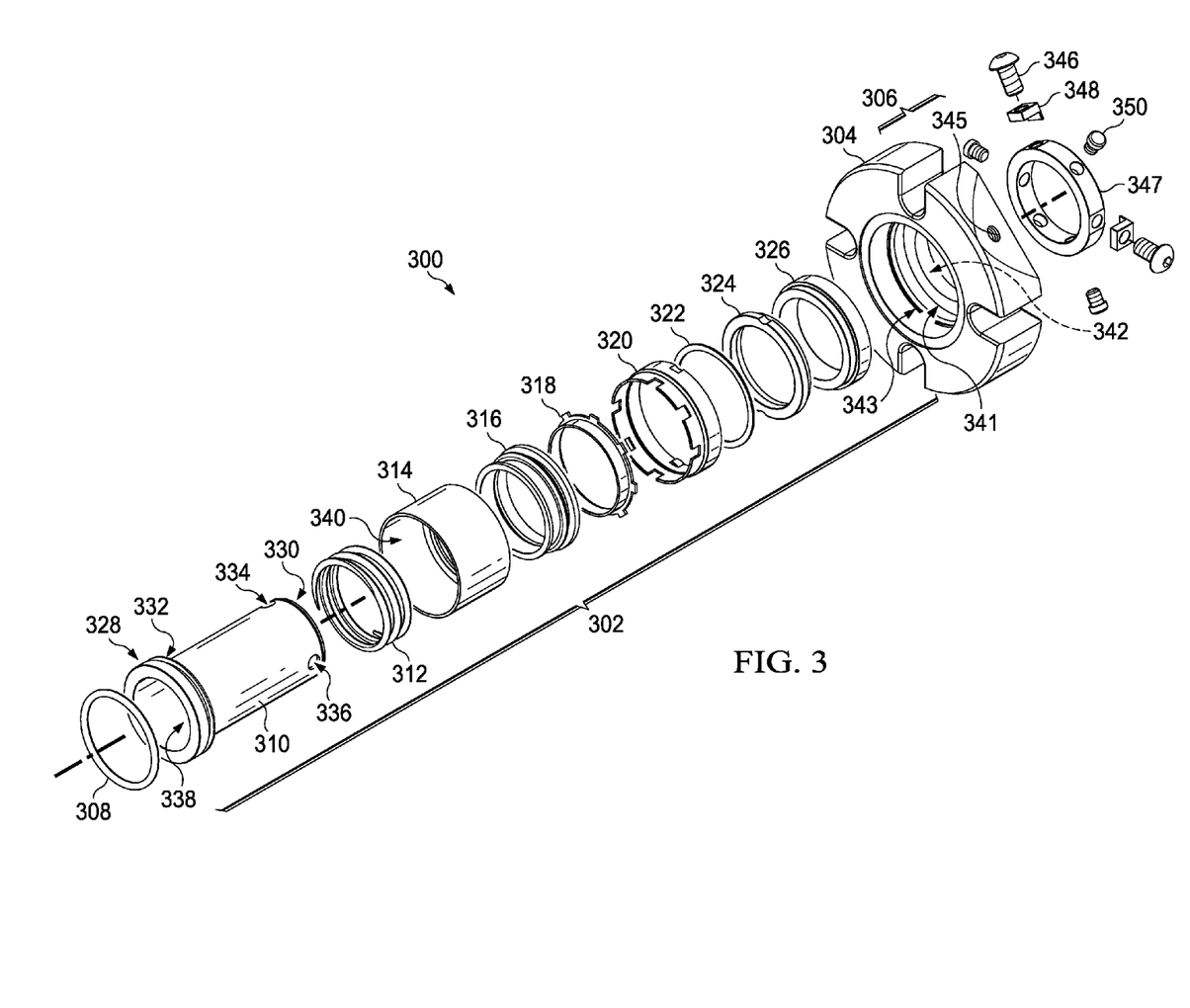
FIG. 3 is an illustration of an exploded view of a cartridge seal for a centrifugal pump in accordance with an illustrative embodiment.

Turning now to FIG. 3, an illustration of an exploded view of a cartridge seal for a centrifugal pump is depicted in accordance with an illustrative embodiment. As depicted, cartridge seal 300 is an example of cartridge seal system 218 shown in block form in FIG. 2. In this illustrative example, cartridge seal 300 includes shaft tube assembly 302, structure 304, and shaft collar assembly 306. Shaft tube assembly 302 is an example of shaft tube assembly 226 shown in block form in FIG. 2, structure 304 is an example of structure 228 shown in block form in FIG. 2, and shaft collar assembly 306 is an example of shaft collar assembly 230 shown in block form in FIG. 2.

In this illustrative example, shaft tube assembly 302 includes o-ring 308, shaft tube 310, spring 312, chamber tube 314, sleeve seal 316, sleeve insert 318, slotted sleeve 320, o-ring 322, sleeve seal 324, and bearing 326.

As depicted, shaft tube 310 has first end 328 and second end 330. In this illustrative example, circumferential grove 332 of shaft tube 310 is located at first end 328 of shaft tube 310. Shaft collar mounting location 334 and shaft collar mounting location 336 in second end 330 of shaft tube 310 are examples of shaft collar mounting locations 248 in block form in FIG. 2. As depicted, interior 338 of shaft tube 310 is an example of interior 238 in block form in FIG. 2.

In this illustrative example, chamber 340 of chamber tube 314 is an example of chamber 236 in block form in FIG. 2. As depicted, first end 341 and second end 342 of structure 304 is an example of first end 258 and second end 260 of structure 228 shown in block form in FIG. 2.

As depicted, structure 304 includes circumferential grove 343. In this illustrative example, during assembly of cartridge seal 300, o-ring 322 is placed in circumferential grove 343. Bearing 326 is placed through o-ring 322 to come into contact with first end 341 of structure 304. As depicted, structure 304 includes flush 345. In this illustrative example, flush 345 provides access to cartridge seal 300 for injecting cooling fluids, cleaning, lubricating, and other suitable purposes.

In this illustrative example, shaft collar assembly 306 includes shaft collar 347, a number of fasteners 346, a number of block washers 348, and a number of set screws 350. In these illustrative examples, the number of block washers 348 are located on the number of fasteners 346. The number of fasteners 346 and the number of set screws 350 attach shaft collar 347 to second end 330 of shaft tube 310.

Figure 4:
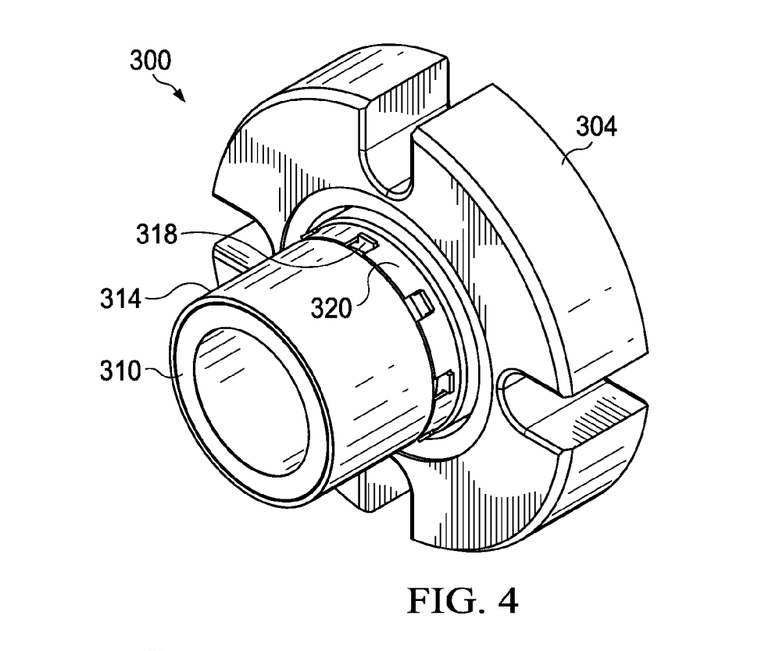
FIG. 4 is an illustration of an isometric view of a cartridge seal for a centrifugal pump in accordance with an illustrative embodiment.

With reference next to FIG. 4, an illustration of an isometric view of a cartridge seal for a centrifugal pump is depicted in accordance with an illustrative embodiment. The components in FIG. 4 are illustrative examples of the components shown in the exploded view of cartridge seal 300 in FIG. 3.

Figure 5:
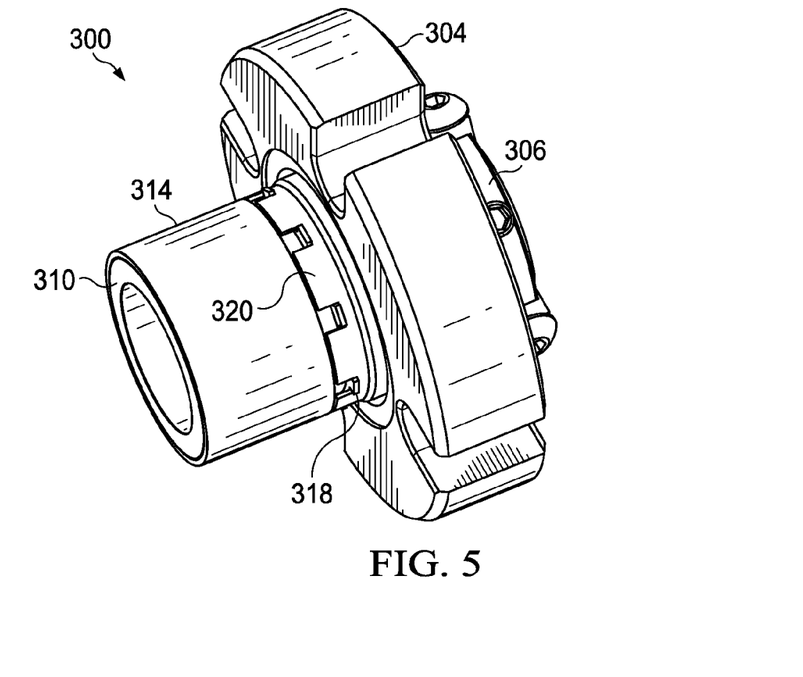
FIG. 5 is another illustration of an isometric view of a cartridge seal for a centrifugal pump in accordance with an illustrative embodiment.

Turning to FIG. 5, another illustration of an isometric view of a cartridge seal for a centrifugal pump is depicted in accordance with an illustrative embodiment. The components in FIG. 5 are illustrative examples of the components shown in the exploded view of cartridge seal 300 in FIG. 3.

Figure 6:
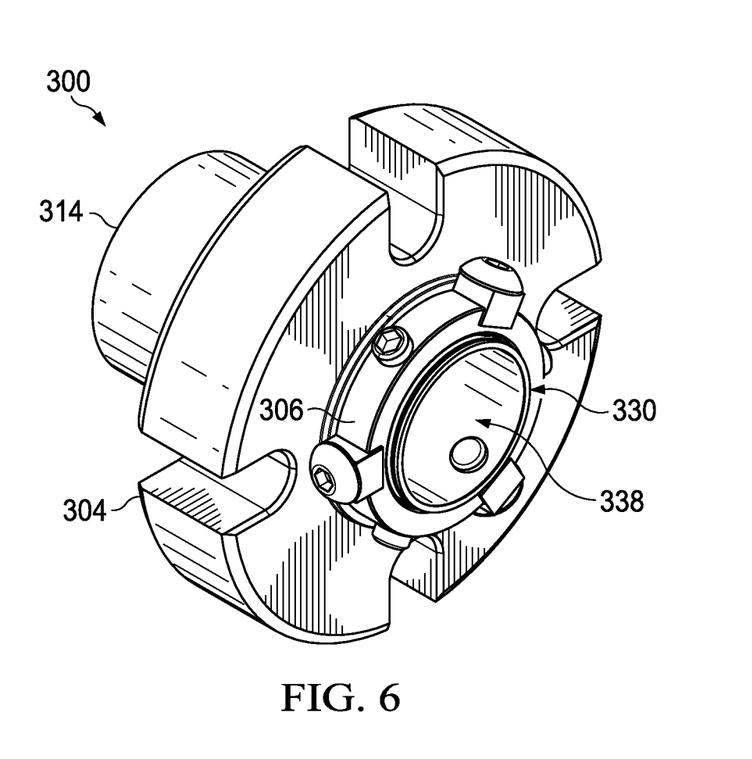
FIG. 6 is another illustration of an isometric view of a cartridge seal for a centrifugal pump in accordance with an illustrative embodiment.

Turning next to FIG. 6, another illustration of an isometric view of a cartridge seal for a centrifugal pump is depicted in accordance with an illustrative embodiment. The components in FIG. 6 are illustrative examples of the components shown in the exploded view of cartridge seal 300 in FIG. 3.

Figure 7:
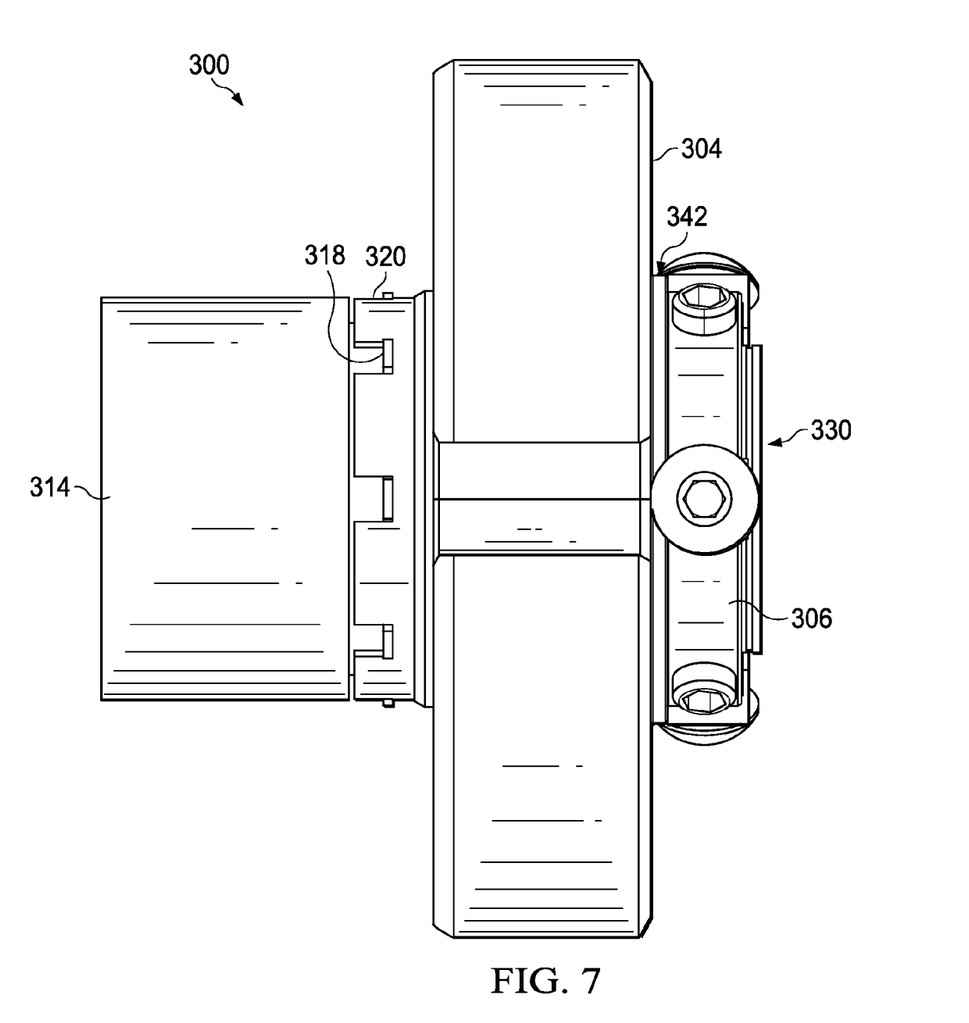
FIG. 7 is an illustration of a side view of a cartridge seal for a centrifugal pump in accordance with an illustrative embodiment.

With reference next to FIG. 7, an illustration of a side view of a cartridge seal for a centrifugal pump is depicted in accordance with an illustrative embodiment. The components in FIG. 7 are illustrative examples of the components shown in the exploded view of cartridge seal 300 in FIG. 3.

Figure 8:
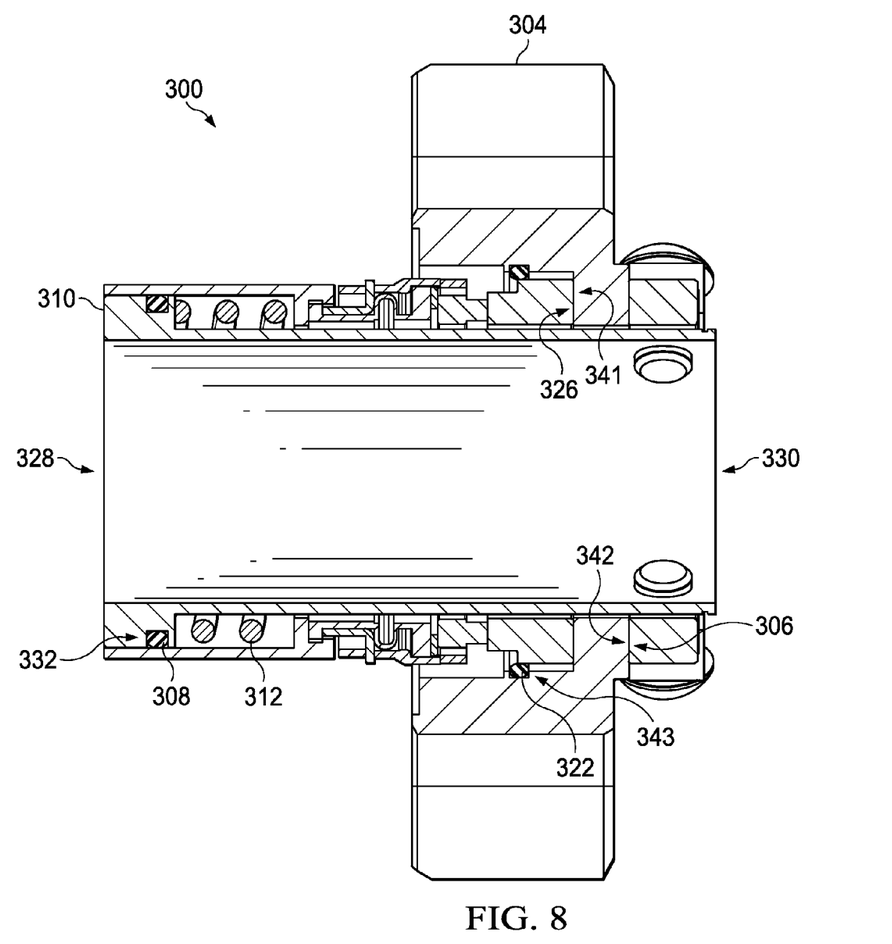
FIG. 8 is an illustration of a cross-sectional view of the side view of the cartridge seal in FIG. 7 in accordance with an illustrative embodiment.

Turning to FIG. 8, an illustration of a cross-sectional view of the side view of the cartridge seal in FIG. 7 is depicted in accordance with an illustrative embodiment. The components in FIG. 8 are illustrative examples of the components shown in the exploded view of cartridge seal 300 in FIG. 3.

In this illustrative example, bearing 326 is in contact with first end 341 of structure 304. Second end 342 of structure 304 is in contact with shaft collar assembly 306.

Figure 9:
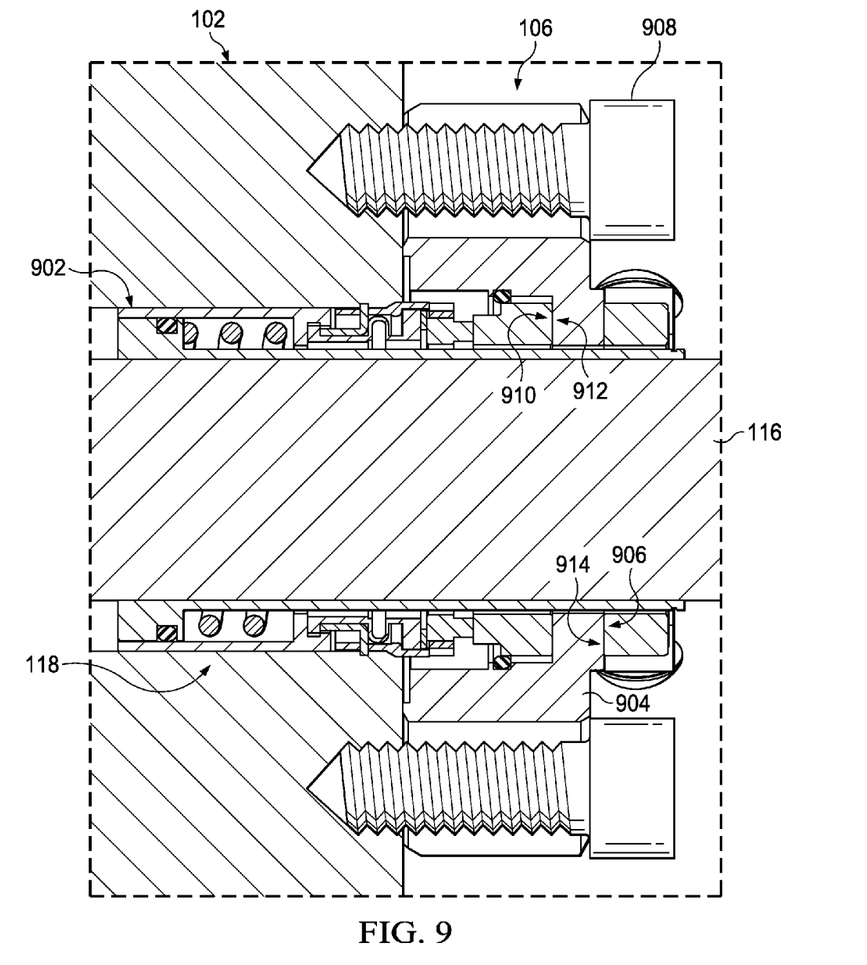
FIG. 9 is an illustration of a magnified view of portion 120 in FIG. 1 of the example of the environment in which the cartridge seal will be used in accordance with an illustrative embodiment.

Turning next to FIG. 9, an illustration of a magnified view of portion 120 in FIG. 1 of the example of the environment in which the cartridge seal will be used is depicted in accordance with an illustrative embodiment. As depicted, cartridge seal system 118 is an example of cartridge seal system 218 shown in block form in FIG. 2.

In this illustrative example, cartridge seal system 118 includes shaft tube assembly 902, structure 904, and shaft collar assembly 906. Shaft tube assembly 902 is an example of shaft tube assembly 226 shown in block form in FIG. 2, structure 904 is an example of structure 228 shown in block form in FIG. 2, and shaft collar 906 is an example of shaft collar 262 shown in block form in FIG. 2. As depicted, structure 904 is attached to centrifugal pump 102 using number of bolts 908.

In this illustrative example, shaft tube assembly 902 includes bearing 910. Bearing 910 is an example of bearing 326 in FIG. 3.

As depicted, first end 912 and second end 914 of structure 904 are examples of first end 258 and second end 260 of structure 228 shown in block form in FIG. 2.

Figure 10:
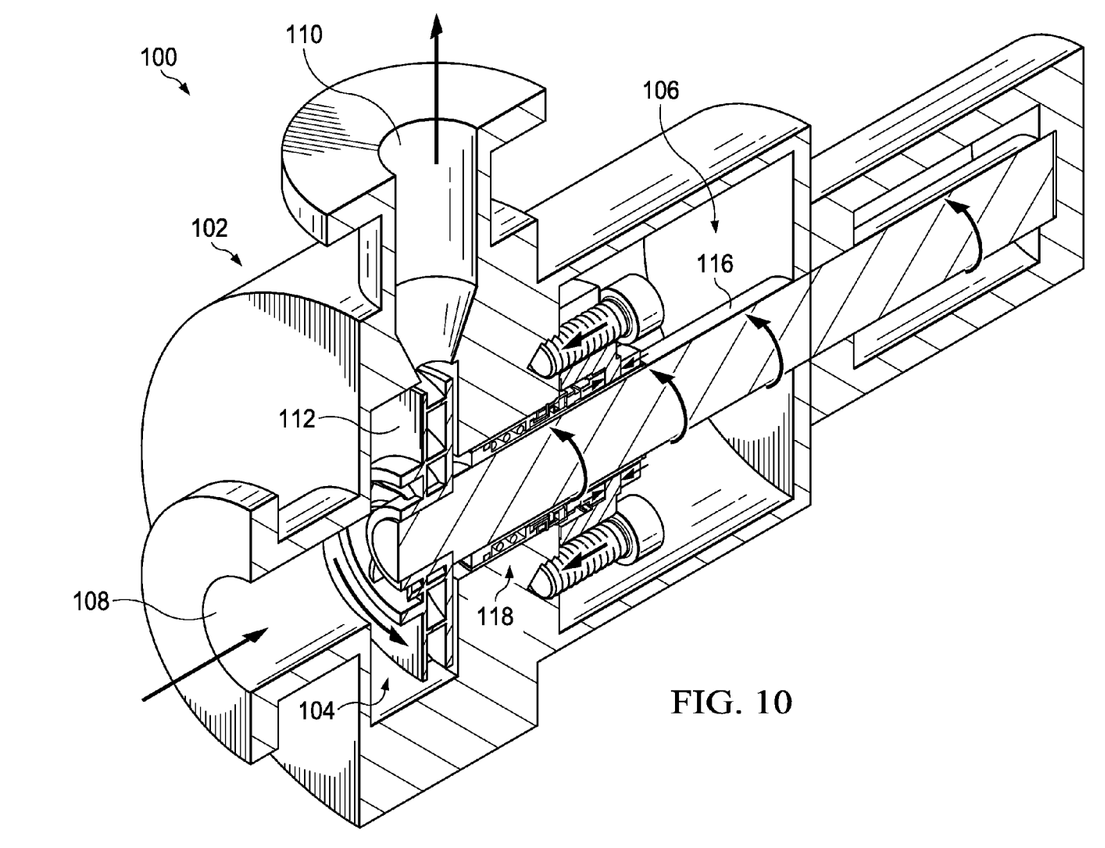
FIG. 10 is an illustration of operation of a cartridge seal in an isometric view of an example of an environment in which the cartridge seal will be used in accordance with an illustrative embodiment.

Turning now to FIG. 10, an illustration of operation of a cartridge seal in an isometric view of an example of an environment in which the cartridge seal will be used is depicted in accordance with an illustrative embodiment. The components in FIG. 10 are illustrative examples of the components shown in centrifugal pump environment 100 in FIG. 1.

In the illustrated example, shaft 116 of centrifugal pump 102 is turned by a motor. The turning of shaft 116 forces impeller 112 in centrifugal pump 102 to rotate about the axis of shaft 116. In this illustrative example, liquids entering input 108 of centrifugal pump 102 are forced through output 110 of centrifugal pump 102 by the rotation of impeller 112.

As depicted, cartridge seal system 118 in centrifugal pump 102 is located between chamber 104 and chamber 106. In this illustrative example, cartridge seal system 118 in centrifugal pump 102 is attached to shaft 116 by a shaft tube assembly. A structure of cartridge seal system 118 is attached to centrifugal pump 102 between chamber 104 and chamber 106 in this illustrative example.

As depicted, a chamber in cartridge seal system 118 contains compressed gas and a spring. The compressed gas and the spring provide force which causes cartridge seal system 118 to maintain contact with the structure. In this illustrative example, cartridge seal system 118 substantially prevents movement of fluids over shaft 116 between chamber 104 and chamber 106.

Figure 11:
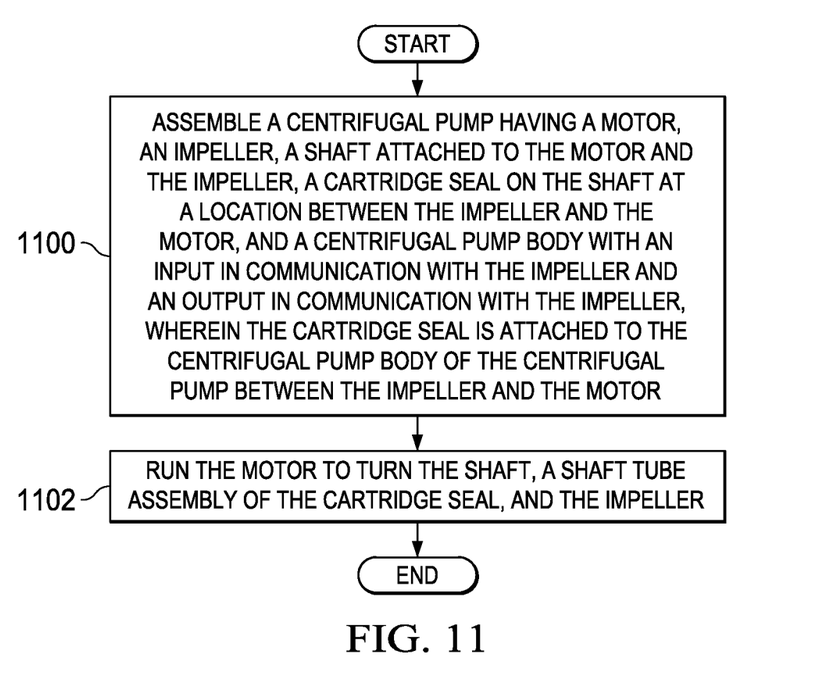
FIG. 11 is an illustration of a flowchart of a process for operating a cartridge seal in a centrifugal pump in accordance with an illustrative embodiment.

With reference next to FIG. 11, an illustration of a flowchart of a process for operating a cartridge seal in a centrifugal pump is depicted in accordance with an illustrative embodiment. In this illustrative example, the process depicted in FIG. 11 may be implemented using components of centrifugal pump environment 200 shown in block form in FIG. 2.

The process begins by assembling a centrifugal pump having a motor, an impeller, a shaft attached to the motor and the impeller, a cartridge seal on the shaft at a location between the impeller and the motor, and a centrifugal pump body with an input in communication with the impeller and an output in communication with the impeller, wherein the cartridge seal is attached to the centrifugal pump body of the centrifugal pump between the impeller and the motor (operation 1100).

The process then runs the motor to turn the shaft, a shaft tube assembly of the cartridge seal, and the impeller (operation 1102) with the process terminating thereafter. For example, turning the impeller may cause fluids to move from the input of the centrifugal pump body to the output of the centrifugal pump body. In this example, compressed gas and a spring in a chamber of the shaft tube assembly cause the cartridge seal to substantially prevent movement of fluids in the centrifugal pump body of the centrifugal pump at the location along the shaft where the cartridge seal is located between the impeller and the motor.

Additional operations may be performed by the process for operating the cartridge seal in the centrifugal pump. For example, the process may adjust an amount of gas in the chamber to modify an amount of force being applied by the cartridge seal on a location where the cartridge seal is attached to the centrifugal pump body.

Figure 12:
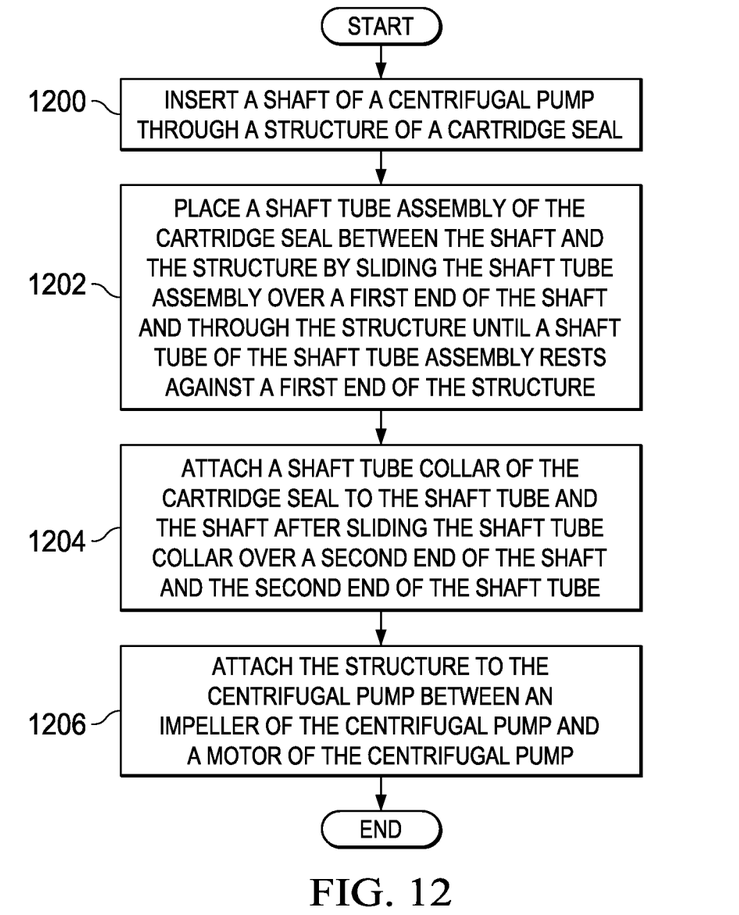
FIG. 12 is an illustration of a flowchart of a process for fitting a cartridge seal in a centrifugal pump in accordance with an illustrative embodiment.

Turning next to FIG. 12, an illustration of a flowchart of a process for fitting a cartridge seal in a centrifugal pump is depicted in accordance with an illustrative embodiment. In this illustrative example, the process depicted in FIG. 12 may be implemented using components of centrifugal pump environment. 200 shown in block form in FIG. 2.

The process begins by inserting a shaft of a centrifugal pump through a structure of a cartridge seal (operation 1200). The process places a shaft tube assembly of the cartridge seal between the shaft and the structure by sliding the shaft tube assembly over a first end of the shaft and through the structure until a shaft tube of the shaft tube assembly rests against a first end of the structure (operation 1202).

The process next attaches a shaft tube collar of the cartridge seal to the shaft tube and the shaft after sliding the shaft tube collar over a second end of the shaft and the second end of the shaft tube (operation 1204). For example, the process may include compressing the cartridge seal with sufficient force to attach the cartridge seal to the structure using the shaft tube collar. The process then attaches the structure to the centrifugal pump between an impeller of the centrifugal pump and a motor of the centrifugal pump (operation 1206) with the process terminating thereafter.

Thus, the illustrative embodiments provide a cartridge seal for a centrifugal pump, a system to prevent movement of fluids between two chambers of a centrifugal pump, and a method to operate centrifugal pumps. The cartridge seal is attached to the centrifugal pump via a structure of the cartridge seal. The structure is attached to the centrifugal pump between two chambers of the centrifugal pump. The cartridge seal is located on a shaft of the centrifugal pump. In the illustrative examples, compressed gas in a chamber of the cartridge seal adjusts an amount of force exerted by a spring in the chamber. The cartridge seal uses the adjusted amount of force to maintain a desired amount of contact with the structure. This desired amount of contact with the structure results in a substantial prevention of the movement of fluids between the two chambers of the centrifugal pump.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A cartridge seal for a centrifugal pump comprising:
a structure having a first end and a second end to which a shaft tube assembly of the cartridge seal is attached;
a shaft tube of the shaft tube assembly having a first end with a larger outside circumference than a second end of the shaft tube, and an interior portion of the shaft tube that receives a shaft of the centrifugal pump;
a shaft collar attached to the second end of the shaft tube in communication with the second end of the structure;
a chamber tube of the shaft tube assembly in communication with the first end of the shaft tube, the first end of the structure, and a portion of the shaft tube between the first end of the shaft tube and the second end of the shaft tube, wherein the chamber tube and the shaft tube collectively define a chamber that contains compressed gas; and
a spring located in the chamber of the compressed gas, wherein the compressed gas and the spring cause the shaft tube assembly to substantially prevent movement of fluids between the shaft and the structure in the centrifugal pump.

2. The cartridge seal of claim 1, wherein a first end of the chamber tube has an interior circumference substantially similar to the outside circumference of the first end of the shaft tube and a second end of the chamber tube has an interior circumference substantially similar to the outside circumference of the second end of the shaft tube.

3. The cartridge seal of claim 1, wherein the first end of the shaft tube includes a circumferential groove that receives an o-ring to form a seal for the compressed gas within the chamber.

4. The cartridge seal of claim 1, wherein the spring is a compression spring selected from one or more of a coil spring and a wave spring.

5. The cartridge seal of claim 1, further comprising:
   a lubricant located within the chamber forming a wet seal within a region where the chamber tube of the shaft tube assembly is in communication with the first end of the shaft tube and the portion of the shaft tube between the first end of the shaft tube and the second end of the shaft tube.

6. The cartridge seal of claim 1, wherein the second end of the shaft tube has a number of locations for attaching the shaft tube to the shaft collar.

7. The cartridge seal of claim 1, wherein the shaft is attached to an impeller assembly at a first location of the shaft, a drive assembly is attached to the shaft at a second location of the shaft, and the cartridge seal is located between the first location and the second location.

8. The cartridge seal of claim 1, wherein the structure is a gland.

9. A system to prevent movement of fluids between two chambers of a centrifugal pump, the system comprising:
   a sealing unit having a shaft tube system and a structural unit, wherein the structural unit has a first end, a second end, an axial hole for holding the shaft tube system, the structural unit is mounted between the two chambers of the centrifugal pump, and wherein the shaft tube system is attached to the first end and the second end of the structural unit;
   a shaft tube of the shaft tube system having a first end with a larger outside circumference than a second end of the shaft tube, and an interior portion of the shaft tube receiving a shaft of the centrifugal pump;
   a shaft collar of the sealing unit attached to the second end of the shaft tube in communication with the second end of the structural unit;
   a chamber tube of the shaft tube system is in communication with the first end of the shaft tube, the first end of the structural unit, and a portion of the shaft tube between the first end of the shaft tube and the second end of the shaft tube, wherein the chamber tube and the shaft tube collectively define a chamber that contains compressed gas; and
   a spring located in the chamber of the compressed gas, wherein the compressed gas and the spring cause the sealing unit to substantially prevent the movement of fluids between the two chambers of the centrifugal pump.

10. The system of claim 9, wherein a first end of the chamber tube has an interior circumference substantially similar to the outside circumference of the first end of the shaft tube and a second end of the chamber tube has an interior circumference substantially similar to the outside circumference of the second end of the shaft tube.

11. The system of claim 9, wherein the first end of the shaft tube includes a circumferential groove that receives an o-ring to form a seal for the compressed gas within the chamber.

12. The system of claim 9, wherein the spring is a compression spring selected from one or more of a coil spring and a wave spring.

13. The system of claim 9, further comprising:
   a lubricant located within the chamber forming a wet seal within a region where the chamber tube of the shaft tube system is in communication with the first end of the shaft tube, and the portion of the shaft tube between the first end of the shaft tube and the second end of the shaft tube.

14. The system of claim 9, wherein the second end of the shaft tube has a number of locations for attaching the shaft tube to the shaft collar.

15. The system of claim 9, wherein the shaft is attached to an impeller assembly at a first location of the shaft, a drive assembly is attached to the shaft at a second location of the shaft, and the sealing unit is located between the first location and the second location.

16. The system of claim 9, wherein the structural unit is a gland.

17. A method of operating centrifugal pumps, the method comprising:
   assembling a centrifugal pump having a motor, an impeller, a shaft attached to the motor and the impeller, a cartridge seal on the shaft at a location between the impeller and the motor, and a centrifugal pump body with an input in communication with the impeller and an output in communication with the impeller, wherein the cartridge seal is attached to the centrifugal pump body of the centrifugal pump between the impeller and the motor; and
   running the motor to turn the shaft, a shaft tube assembly of the cartridge seal, and the impeller, wherein turning the impeller causes fluids to move from the input of the centrifugal pump body to the output of the centrifugal pump body, wherein compressed gas and a spring in a chamber of the shaft tube assembly cause the cartridge seal to substantially prevent movement of fluids in the centrifugal pump body of the centrifugal pump at the location along the shaft where the cartridge seal is located between the impeller and the motor.

18. The method of claim 17, wherein a shaft tube of the shaft tube assembly has a first end with a larger outside circumference than a second end of the shaft tube, and an interior portion of the shaft tube that receives the shaft of the centrifugal pump, and the shaft tube has a circumferential groove that receives an o-ring to form a seal for the compressed gas within the chamber.

19. The method of claim 18, wherein the step of attaching the cartridge seal to the centrifugal pump body of the centrifugal pump between the impeller and the motor includes first compressing the cartridge seal with sufficient force to attach the cartridge seal to the centrifugal pump body using a shaft collar of the cartridge seal, wherein the shaft collar of the shaft tube assembly is attached to the second end of the shaft tube and is in communication with the centrifugal pump body.

20. The method of claim 17, wherein the spring is a compression spring selected from one or more of a coil spring and a wave spring.

* * * * *